(12) United States Patent
Tillotson

(10) Patent No.: US 8,547,225 B2
(45) Date of Patent: Oct. 1, 2013

(54) SYSTEMS AND METHODS FOR REMOTE DETECTION OF VOLCANIC PLUMES USING SATELLITE SIGNALS

(75) Inventor: Brian J. Tillotson, Kent, WA (US)

(73) Assignee: The Boeing Company, Chicago, IL (US)

( * ) Notice: Subject to any disclaimer, the term of this patent is extended or adjusted under 35 U.S.C. 154(b) by 448 days.

(21) Appl. No.: 12/883,334

(22) Filed: Sep. 16, 2010

(65) Prior Publication Data

US 2012/0068863 A1 Mar. 22, 2012

(51) Int. Cl.
*G08B 1/08* (2006.01)
(52) U.S. Cl.
USPC ................. 340/539.19; 340/539.16; 340/601
(58) Field of Classification Search
USPC ..................... 340/539.1, 539.13, 539.26, 601,
340/905, 963, 968, 971, 974, 980, 982, 983,
340/539.16, 539.17, 539.19; 701/2, 4, 24,
701/528; 702/3, 4, 14, 15
See application file for complete search history.

(56) References Cited

U.S. PATENT DOCUMENTS

| | | | |
|---|---|---|---|
| 5,602,543 A | 2/1997 | Prata et al. | |
| 5,995,040 A * | 11/1999 | Issler et al. | 342/352 |
| 7,002,349 B2 * | 2/2006 | Barringer | 324/330 |
| 7,365,674 B2 | 4/2008 | Tillotson et al. | |
| 7,383,131 B1 | 6/2008 | Wey et al. | |
| 7,592,955 B2 | 9/2009 | Tillotson et al. | |
| 7,598,901 B2 | 10/2009 | Tillotson et al. | |
| 7,734,411 B2 | 6/2010 | Gremmert | |
| 7,742,845 B2 * | 6/2010 | Fink et al. | 701/2 |
| 2005/0141465 A1 * | 6/2005 | Kato et al. | 370/337 |
| 2005/0200480 A1 * | 9/2005 | Caras et al. | 340/539.22 |
| 2009/0189802 A1 | 7/2009 | Tillotson et al. | |

OTHER PUBLICATIONS

European Search Report, EP 11180158, Apr. 4, 2012.
Thomas et al: "Observations of volcanic emissions from space: current and future perspectives", Natural hazards, Kluwer Academic Publishers, vol. 54, No. 2, Oct. 30, 2009, pp. 323-354.
Ao et al., "Lower-Troposphere Refractivity Bias in GPS Occultation Retrievals", J. Geophys. Res., vol. 108, Issue D18 (2003).
Bouttier et al., Data Assimilation Concepts and Methods, Mar. 1999, Chapter 10, "Four-Dimensional Variational Assimilation (4D-Var)".

* cited by examiner

*Primary Examiner* — Van T. Trieu
(74) *Attorney, Agent, or Firm* — Ostrager Chong Flaherty & Broitman P.C.

(57) ABSTRACT

Systems and methods for remote detection of volcanic plumes using satellite signals. The invention solves the problem of remotely detecting volcanic plumes, including those embedded in clouds, by providing a system that can be installed onboard a mobile platform, such as an aircraft, a satellite, a weather balloon, a ship or a buoy. The volcanic plume detection system tracks RF signals (such as GPS signals from satellites) arriving at the mobile platform, and issues an alert or warning when characteristics of the RF signals indicate the likely presence of a volcanic plume in the monitored space. More specifically, the system in accordance with one embodiment utilizes the refractive properties of hydrogen sulfide ($H_2S$), a gas that is abundant in nearly all volcanic eruptions, to infer the presence of a volcanic plume.

21 Claims, 7 Drawing Sheets

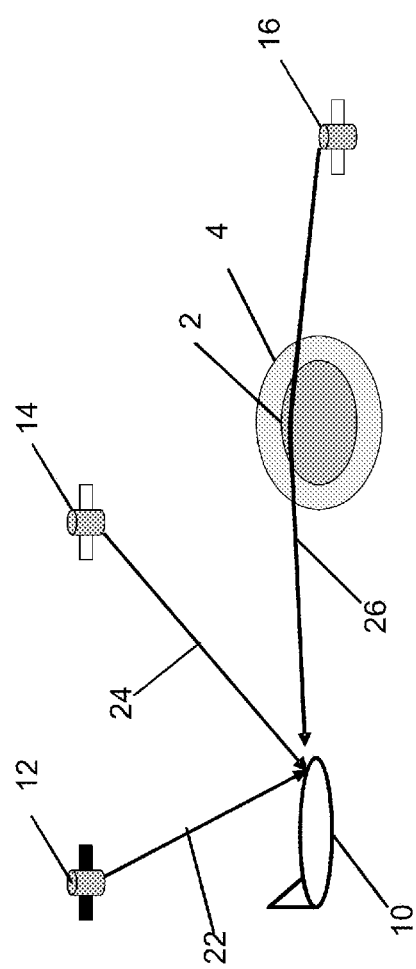
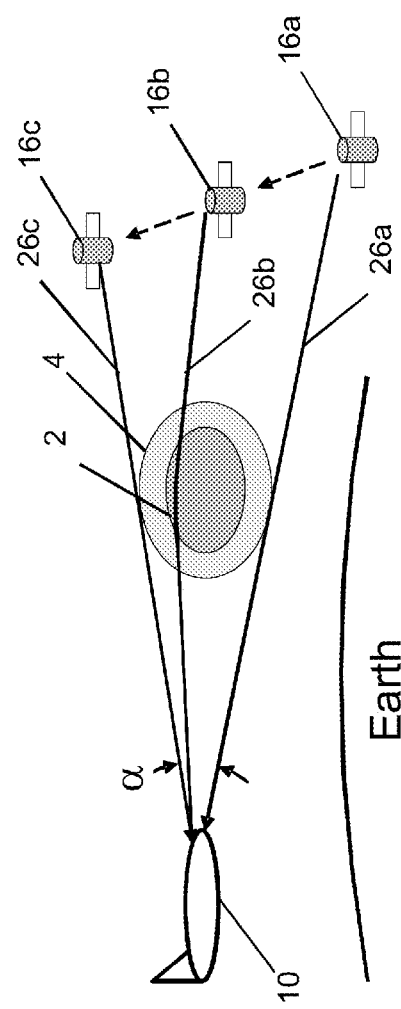

SYSTEMS AND METHODS FOR REMOTE DETECTION OF VOLCANIC PLUMES USING SATELLITE SIGNALS

BACKGROUND

This invention generally relates to systems and methods for remotely detecting a volcanic plume using received radiofrequency (RF) signals that have traversed the plume. In particular, this invention relates to systems and methods for remotely detecting a volcanic plume embedded in clouds using satellite-transmitted RF signals.

As used herein, the term "volcanic plume" means a cloud of volcanic ash and the term "volcanic gases" means gases given off by active volcanoes. Dispersed volcanic gases disposed outside the volume occupied by a volcanic ash cloud are not included as part of the "volcanic plume," as the latter term is used herein.

Volcanic ash can pose a hazard to flying jet aircraft, threaten the health of people and livestock, damage electronics and machinery, and interrupt power generation and telecommunications. Volcanic ash comprises tiny jagged particles of rock and natural glass blasted into the air by a volcano. Wind can carry ash thousands of miles, affecting far greater areas than other volcano hazards.

Volcanic plumes present two problems for aircraft: (a) engine shutdown due to ash; and (b) aircraft damage and/or crew and passenger injury due to ash and corrosive gases. Volcanic ash particles are extremely abrasive. They are jagged particles of rock and glass that can cause rapid wear to the internal workings of jet engines. More important, high temperatures in some parts of jet engines can melt the ash; it then re-solidifies on cooler parts of the engine, forming a layer that blocks airflow, interferes with moving parts, and eventually shuts down the engine.

Another issue is the potentially harmful effects of elevated concentrations of $SO_2$ and sulfate aerosol in ash-poor clouds on aircraft and avionics. In addition, volcanic ash particles, with sulfuric acid adhered thereto, are tiny enough to travel deep into the lungs of human beings, which may be harmful and potentially fatal to people.

Various known solutions for detecting and avoiding a volcanic plume during flight of an aircraft have certain disadvantages. First, in daytime clear weather, pilots can see and avoid the visually distinctive cloud from an erupting volcano. However, volcanic plumes are often encountered during nighttime and/or embedded within other clouds. Therefore, visual detection is not always effective.

Second, for volcanoes that are well monitored, sensors or people on the ground can quickly observe an eruption and report it to flight safety authorities such as the FAA. In these cases, a notice to airmen is issued. However, many remote volcanoes around the world are still not well instrumented and can erupt without immediate detection. Even after detection, the mechanism to issue a notice to airmen imposes a delay for processing and distribution, during which an unwarned aircraft may encounter the plume.

Third, a few satellites are capable of detecting volcanic plumes from orbit, based on the sulfur dioxide spectra, the thermal infrared emission, visible ash clouds, or a combination of these. When a satellite detects a volcanic plume, a notice to airmen is issued. However, satellite observations are not continuous. An eruption that occurs between satellite passes may go undetected for 6 to 12 hours, which is more than enough time for aircraft to encounter the plume. The period of non-detection may go on longer for small eruptions or during overcast conditions. Even after detection, the mechanism to issue a notice to airmen imposes a delay for processing and distribution, during which an unwarned aircraft may encounter the plume.

Fourth, onboard systems for detecting the presence of a volcanic plume during flight have been proposed in various patents. For example, U.S. Pat. No. 5,654,700, entitled "Detection System for Use in an Aircraft," proposes a system that would detect a volcanic ash cloud ahead of an aircraft by monitoring infrared radiation that traverses the ash cloud; and U.S. Pat. No. 7,383,131, entitled "Airborne Volcanic Ash Cloud and Eruption Detection System and Method," proposes the provision of an onboard computer having program logic "configured to correlate the location of a volcano from [a] database with the presence of lightning from [a] lightning detector and a volcanic ash plume from [a] weather radar."

There exists a need for a system that will detect and alert an aircraft to avoid volcanic plumes, which may stretch for hundreds of miles through a variety of atmospheric conditions, including clouds. Detecting plumes embedded in clouds is of particular interest, since these cannot be visually detected by pilots. Repeated fly-throughs of even dilute plumes can cause long-term damage to aircraft, including structures, engines and electrical equipment, because of the corrosive nature of the hydrogen sulfide ($H_2S$) and sulfur dioxide ($SO_2$) gases in plumes.

BRIEF SUMMARY

The invention solves the problem of remotely detecting volcanic plumes, including those embedded in clouds, by providing a system that can be installed onboard a mobile platform, such as an aircraft, a satellite, a weather balloon, a ship or a buoy. The volcanic plume detection system tracks RF signals (such as GPS signals from satellites) arriving at the mobile platform, and issues an alert or warning when characteristics of the RF signals indicate the likely presence of a volcanic plume in the monitored space. More specifically, the system in accordance with one embodiment utilizes the refractive properties of hydrogen sulfide ($H_2S$) and/or sulfur dioxide ($SO_2$), gases that are abundant in nearly all volcanic eruptions, to infer the presence of a volcanic plume.

In the case of a volcanic plume detection system installed onboard an aircraft, the measured phase shifts of radio signals from satellites are used to measure the atmospheric index of refraction at cruise altitude. A typical phase shift pattern produced by a volcanic plume is compared to the phase pattern detected by the onboard system. The pilot is alerted when there is a sufficiently close match of the acquired pattern and the reference pattern. Alternatively, a typical phase shift pattern produced in the absence of a volcanic plume is compared to the phase pattern detected by the onboard system, and the pilot is alerted when anomalies indicative of a volcanic plume are present. In either case, the alert may include an estimated direction and/or range to a point of interest in the plume.

A volcanic plume has substantial volume; it is not a single point in space. As used herein, the term "range to a point of interest in the plume" means the distance from the aircraft to a particular point along the axis or on the surface (i.e., outer boundary) of the plume's geometry. Examples of points of interest include the point along the plume's axis nearest to the aircraft, the nearest point on the plume surface at which ash density is high enough to damage aircraft, and the point on the plume surface at which ash density is high enough to damage aircraft and which would be intersected by the aircraft were it to continue on its present course.

For navigation and modeling, typically the plume can be assumed to be generally conical and the axis of the conical plume can be used as the reference. For aviation safety, the pilot should be advised concerning the estimated range (measured along his current flight path) to the outer surface of the ash cloud, i.e., the two-dimensional curve in three-dimensional space at which the density of volcanic ash is just high enough to damage an aircraft.

Various embodiments of the invention combine the use of high-quality GPS receivers onboard aircraft to measure signal quality with a computerized navigation system to compute the relative positions of the aircraft and satellites. A computer then uses the phase shift information from the receivers to detect the presence of a volcanic plume between the aircraft and the satellites. If a volcanic plume is detected in an aircraft's path, a warning is issued to the aircrew. Otherwise, the phase shift measurements can be collected and used by the computer to build a three-dimensional model of the atmosphere that shows the extent and location of the volcanic plume.

The phase shift measurements can be conveyed to end users such as aircrews, air traffic controllers or computers. In accordance with some embodiments, a computer estimates the range to a point of interest in the volcanic plume. Optionally, the computer also estimates the angular extent and/or the upper and lower vertical limits of the plume. In accordance with yet more sophisticated embodiments, the computer can execute a tomography algorithm to construct a three- or four-dimensional model of the volcanic plume.

Some embodiments of the invention use a computational model of a plume's effect on RF signals, given various paths through the plume, to estimate the plume location, orientation, and $H_2S$ concentration profile that give the best fit to measured peak phase delays and the estimated distances and vertical sizes. The "peak phase delay" is a very low-frequency (<1 Hz) effect. If data is available about winds, or about the location and status of dormant or active volcanoes, the system may also use that data to help choose the most plausible plume configuration that is consistent with the RF measurements.

The volcanic plume detection system comprises an RF receiver capable of measuring phase shifts and amplitudes of incoming radio signals from satellites. Signals from more than one satellite constellation (e.g., GPS, GLONASS, and Galileo) can be used by the receiver to make the phase shift measurements. Using more than one constellation improves the availability of transmitted signals, gives better coverage of the atmosphere, and improves the accuracy of the phase shift measurements.

Besides the more-or-less steady change in phase delay as the RF path length through the plume changes, there is a characteristic pattern of RF scintillation caused by turbulence within the plume. Strong scintillation along a cruise-altitude RF path in the absence of thunderstorms is an indication of a volcanic plume. In accordance with some embodiments of the present invention, a plume warning signal is provided when strong scintillation is detected. In accordance with other embodiments, the volcanic plume detection system uses a computational model that approximately models the plume's effect on RF scintillation in amplitude and phase. A further embodiment of the invention combines evidence from the low-frequency phase shift and from scintillation to produce a better estimate of the plume's characteristics than either approach alone can produce.

The alert to the aircraft pilot may be visual or audible and may be accompanied by graphic or audible data concerning the extent and proximity of the volcanic plume. In addition, the phase delay or scintillation pattern can be communicated to the pilot in the form of overlays of pattern data on a cockpit display.

Other aspects of the invention are disclosed and claimed below.

BRIEF DESCRIPTION OF THE DRAWINGS

FIG. 1 is a side view showing radio transmission paths to an airplane from three satellites. One of the radio transmission paths traverses a volcanic plume. The darker shading of the plume cross section indicates higher $H_2S$ concentration.

FIG. 2 is a side view showing radio transmission paths from a satellite to an airplane at three points in time. The radio transmission paths pass below, through and above a volcanic plume respectively. The darker shading of the plume cross section again indicates higher $H_2S$ concentration.

Reference will hereinafter be made to the drawings in which similar elements in different drawings bear the same reference numerals.

DETAILED DESCRIPTION

Figure 3A:
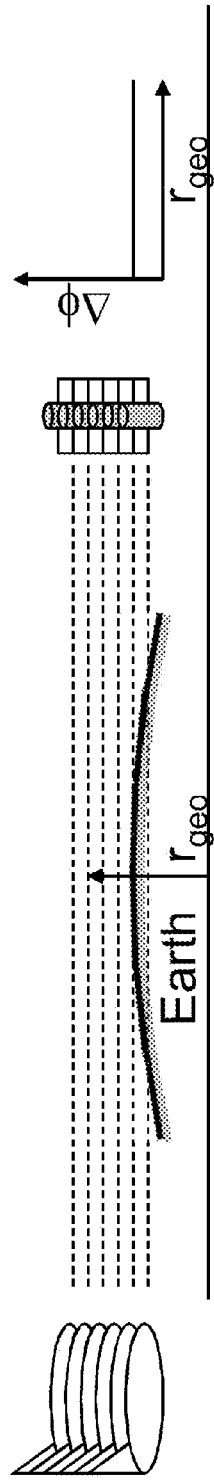
FIG. 3A consists of a diagram showing the concept of an impact parameter $r_{geo}$ graph and a plot showing the phase delay $\Delta\phi$ of an RF signal as a function of $r_{geo}$ when no atmosphere is modeled.

The invention solves the problem of remotely detecting volcanic plumes, including those embedded in clouds, by providing a system that can be installed onboard a mobile platform, such as an aircraft, a satellite, a weather balloon, a ship or a buoy. The volcanic plume detection system tracks RF signals (such as GPS signals from satellites) arriving at the mobile platform, and warns the pilot when characteristics of the RF signals indicate the likely presence of a volcanic plume. More specifically, the system in accordance with one embodiment utilizes the refractive properties of hydrogen sulfide ($H_2S$), a gas that is abundant in nearly all volcanic eruptions, to infer the presence of a volcanic plume. The measured phase shifts of radio signals from satellites are used to measure the atmospheric index of refraction at cruise altitude. A typical phase shift pattern produced by a volcanic plume is compared to the phase pattern detected by the onboard system. The pilot is alerted when there is a sufficiently close match of the acquired pattern and the reference pattern. Alternatively, a typical phase shift pattern produced in the absence of a volcanic plume is compared to the phase pattern detected by the onboard system, and the pilot is alerted when anomalies indicative of a volcanic plume are present. In either case, the alert may include an estimated direction and/or range to a point of interest in the plume.

In accordance with various embodiments of the invention disclosed herein, the volcanic plume detection system comprises an RF receiver capable of measuring the phase shift and, typically, the amplitude, of an incoming RF signal from one or more satellites. The required measurement sensitivity and precision are comparable to those used in airborne RF occultation systems or RF systems to detect clear air turbulence (such as the systems disclosed in U.S. Pat. No. 7,598,901). The volcanic plume detection system compares the detected phase shift pattern (and in typical cases, the amplitude pattern) to the type of pattern resulting from the passage of satellite RF signals through a volcanic plume and alerts the pilot when there is a sufficiently close match. The alert may include an estimated direction and/or range to a point of interest in the plume.

In 1994, Symonds et al. published an article in *Reviews in Mineralogy*, Vol. 30, entitled "Volcanic-Gas Studies: Methods, Results, and Applications," which article included a list of equilibrium compositions of high-temperature, low-pressure (1 bar) gases from various volcanoes. The data presented shows that the composition of gases from volcanoes around the world varies widely, but hydrogen sulfide and sulfur dioxide are at least moderately abundant in nearly all of them. (Note that the most abundant gas, $H_2O$, will quickly precipitate out as the plume cools. The relative abundance of hydrogen sulfide will therefore increase.) The concentrations of hydrogen sulfide and sulfur dioxide in the published volcanic-gas samples respectively varied from 0.04 to 1.12 mole % for the former and from 0.2089 to 47.70 mole % for the latter.

Hydrogen sulfide is a polar molecule with an electric dipole of 0.97 Debye units, roughly half that of water (1.95 Debye units). Since water's dipole moment is known to cause a very strong effect on radio refraction in a humid atmosphere, one can safely presume that hydrogen sulfide causes a strong effect as well. That is, the atmosphere's index of refraction increases strongly in proportion to the amount of hydrogen sulfide present.

At airliner cruising altitude, the air is cold (typically less than $-40°$ C.). Since water has a relatively high boiling temperature ($100°$ C.), its saturation vapor pressure at cold temperatures is quite low: 0.14 mm Hg at $-40°$ C. As a result, air at cruise altitude is dry, so there is little water-induced refraction at cruise altitude. Hydrogen sulfide, however, has a relatively low boiling temperature of $-60.7°$ C. Its vapor pressure at cruise altitudes and temperatures can be well above atmospheric pressure. Therefore, when a volcanic plume lofts a large amount of hydrogen sulfide up to cruise altitudes, essentially all the hydrogen sulfide remains in the air. Its presence produces an atmospheric index of refraction far above any level that could result from moisture in the air at that altitude.

As described in several publications and patent applications, it is feasible to remotely measure atmospheric index of refraction by measuring the phase shift of radio signals passing through the atmosphere. Radio signals from satellites, e.g. GPS, Glonass, Iridium, or DirecTV, are best for measuring cruise-altitude index of refraction. Unlike signals from the ground, satellite signals need not pass through the moisture-rich lower troposphere before reaching an RF receiver on a cruising airliner. Thus, RF phase shift in satellite signals is almost entirely due to cruise-altitude phenomena (like $H_2S$) or to ionospheric delays (which can be measured and subtracted in a well-known manner by comparing the delay of two frequencies, such as the GPS L1 and L2 bands).

For illustration, we assume the radio signal comes from a satellite with a known orbit and a stable radio transmission frequency. A typical signal arriving at an airborne receiver follows a nearly straight path. This is illustrated by the signal paths 22 and 24 from satellites 12 and 14, respectively, to airplane 10 depicted in FIG. 1. A signal that passes through a region with a strong gradient in the index of refraction will follow a curved path. This is illustrated by the path 26 from satellite 16, which traverses the upper side of a volcanic plume 2 having relatively higher $H_2S$ concentration. The surrounding lighter-shaded region 4 in FIG. 1 indicates relatively lower $H_2S$ concentration. The curved path 26 is longer than a straight path from the satellite 16 to the airplane 10. This extra distance adds a phase delay to the signal. In addition, there is a phase delay incurred because the signal is slowed while passing through the region having a high index of refraction. Thus, the signal from satellite 16 has substantially more phase delay than it would if no volcanic plume were present. If the path from satellite 16 to the airplane 10 does not pass through the lower atmosphere (where it could incur a phase delay due to moisture), then the detection system interprets the excess phase delay as an indicator of a likely volcanic plume.

The volcanic plume detection system uses the relative motion of the satellite and the airplane to collect additional information about the volcanic plume. As shown in FIG. 2, motion of the satellite 16 from position 16a to 16b and then to position 16c causes the signal's path to pass above the plume (e.g., path 26c), below the plume (e.g., path 26a), or through various parts of the plume at various times (e.g., path 26b). In the case shown, the excess phase delay begins to increase at position 16a, reaches a maximum shortly before position 16b, and decreases to zero at position 16c. (In practice, it is usually easier to measure Doppler shift than absolute phase delay. Integrating the anomalous Doppler shift at various times during a satellite pass allows a calculation of the phase delays.) The maximum (i.e., peak) phase delay is proportional to the product of distance through the plume ($\Delta\eta$) times average $H_2S$ concentration within the plume. Using the satellite's orbit and the aircraft's position, a computer connected to the receiver and to the aircraft navigational equipment computes the angular extent $\alpha$ of the volcanic plume based on positions 16a and 16c and the distance from the airplane to the satellite. Subsequent satellites allow repeated measurements of $\alpha$ as the aircraft approaches the plume. (For example, an Iridium satellite passes about every 15 minutes.) The plume's angular extent $\alpha$ grows as the airplane gets closer. The rate at which $\alpha$ increases reveals the approximate range to the plume: when $\alpha$ changes a fraction of a percent for each mile the airplane travels, the plume is far away; when $\alpha$ changes 10% per mile the airplane travels, the plume is only a few miles distant. Once the computer has estimated the range to a point of interest in the plume, it uses the angular positions 16a and 16c of the satellite together with the range to a point of interest in the plume and the shape of the Earth to estimate the upper and lower vertical limits of the plume. The pilot or air traffic controller may use this estimate to decide whether aircraft can safely fly over the plume.

Figure 3B:
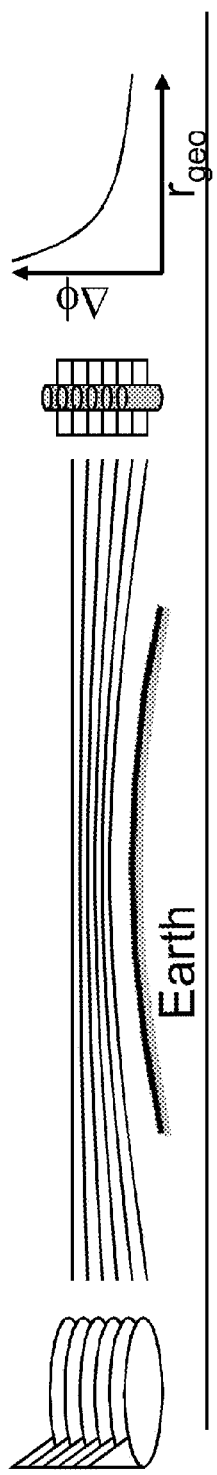
FIG. 3B consists of a diagram showing how an RF signal is refracted in a typical atmosphere and a plot showing the phase delay $\Delta\phi$ of an RF signal as a function of $r_{geo}$ when the typical atmosphere is modeled.
Figure 3C:
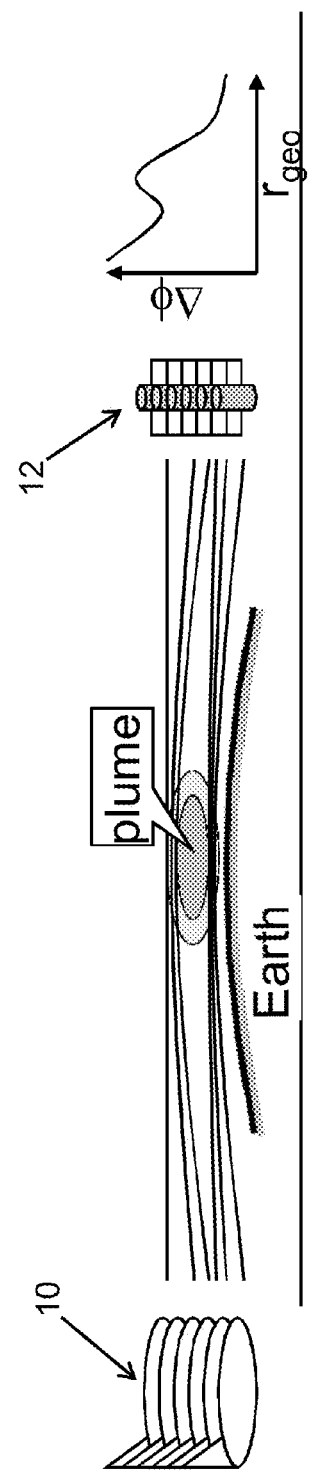
FIG. 3C consists of a diagram showing refraction of RF signals in the presence of a plume and a plot showing the phase delay $\Delta\phi$ of an RF signal as a function of $r_{geo}$ when the volcanic plume is modeled.

In accordance with another embodiment, the volcanic plume detection system computes anomalous phase shifts (i.e., prediction errors) by subtracting measured phase measurements from the predicted phase measurements. FIGS. 3A-3C illustrate an approach to detecting and quantifying an anomaly that would trigger a warning.

FIG. 3A shows the concept of impact parameter $r_{geo}$, which is the distance of closest approach to the Earth's center for a geometrically straight line from an RF transmitter (e.g., a satellite) to a receiver (e.g., an airplane). The impact parameter is unaffected by the atmosphere or the presence of a volcanic plume. As the plot on the right-hand side of FIG. 3A shows, the phase delay $\Delta\phi$ of an RF signal is constant when no atmosphere is modeled.

FIG. 3B shows how an RF signal is refracted in a typical atmosphere: strong refraction for signals that pass close to the Earth (the impact parameter of the signals is actually less than the radius of the Earth's surface), less refraction for signals at moderate altitude, and no refraction for signals that pass through outer space. The phase delay $\Delta\phi$ is a relatively simple monotonic function of the impact parameter $r_{geo}$. This function can be modeled well by a second- or third-order polynomial; if a higher-order polynomial is fit to the curve, the higher-order coefficients are near zero.

FIG. 3C shows refraction in the presence of a volcanic plume. RF signals that pass under the plume may be refracted less than signals that pass over the plume. The curve of $\Delta\phi(r_{geo})$ is more complex, and may not even be monotonic. It does not fit a second- or third-order polynomial. In some embodiments, the volcanic plume detection system fits $\Delta\phi(r_{geo})$ to a higher-order polynomial and compares fourth- or higher-order coefficients to user-selected thresholds to trigger a warning to the crew.

If one considers a three-dimensional case including realistic satellite paths and the Earth's curvature, one must conclude that the situation depicted in FIG. 2 is idealized. Only in very rare cases would an airplane approach a plume perpendicularly while a satellite rises or sets vertically directly ahead of the airplane. Accordingly, one of the tomography approaches can be used to get a valid estimate of range to a point of interest in the plume.

Figure 4:
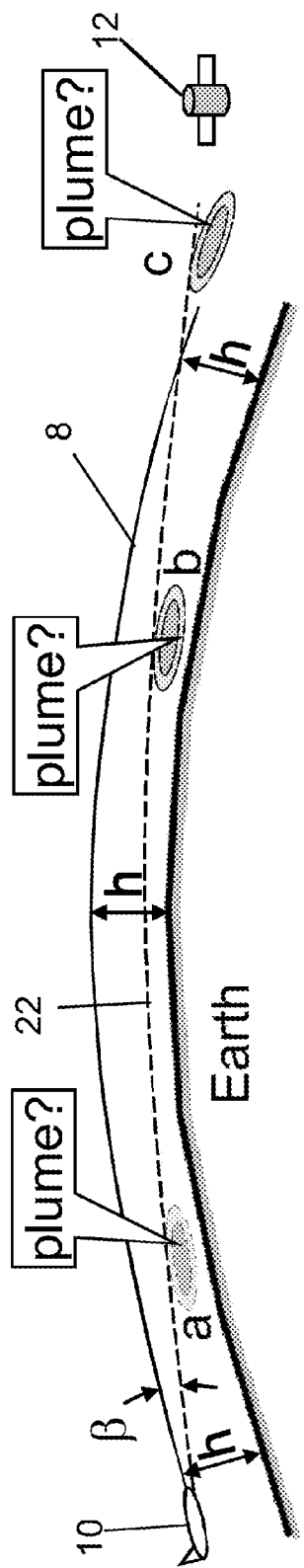
FIG. 4 is a diagram illustrating the principle that an RF signal arriving with a phase delay at an aircraft along a path disposed at a negative elevation angle indicates that a plume is below cruise altitude or far away.

Alternatively, one can do something simpler than tomography to give the crew a quantitative estimate of the hazard posed by a plume. The hazard is related to the highest elevation angle $\beta$ at which a plume is detected. As seen in FIG. 4, the highest elevation angle $\beta$ is the angle (measured at the nose of the aircraft) between the flight path 8 of the aircraft 10 and the incoming signal path 22 of the RF signal received from the satellite 12.

Figure 5:
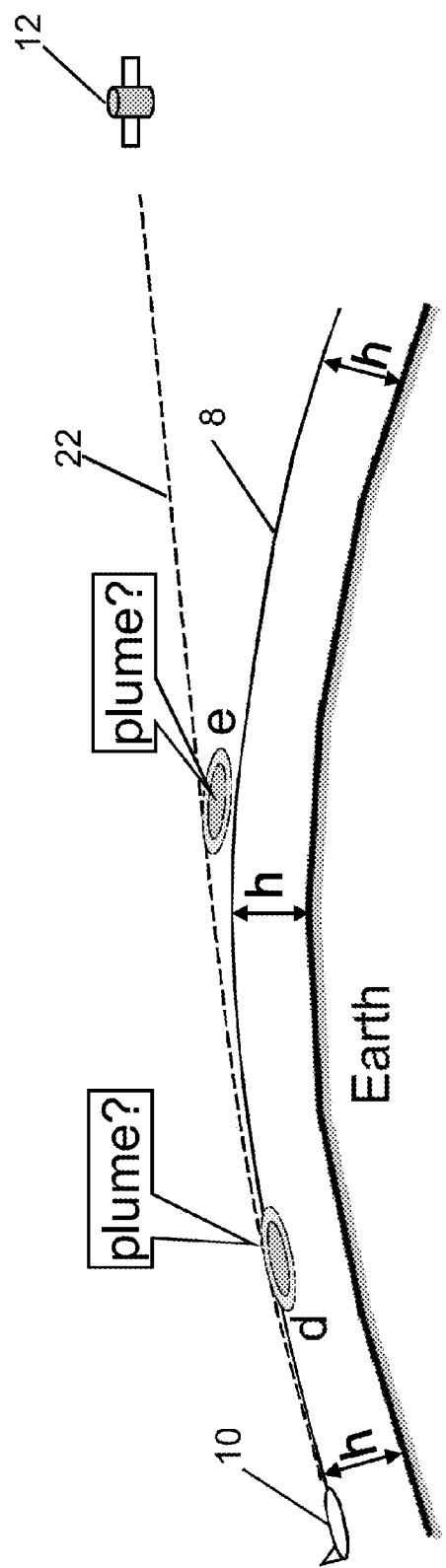
FIG. 5 is a diagram illustrating the principle that an RF signal arriving with a phase delay at an aircraft along a path disposed at a zero or positive elevation angle indicates that a plume is at cruise altitude or higher.

As shown in FIG. 3C, at the points where an RF path intersects a plume, the measured phase shift departs from the expected curve of $\Delta\phi$ vs. impact parameter. Therefore, the elevation angle $\beta$ where an RF signal departs from the expected curve of $\Delta\phi$ corresponds to a surface of a plume. If that angle is negative, as in FIG. 4, the plume is below cruise altitude or very far away, i.e., not an immediate threat. If that angle is zero or above, as in FIG. 5, the plane is either very close to a plume that is at cruise altitude or greater, or it is detecting a plume that is currently at a safe distance but reaches well above cruise altitude—in other words, a plume that may cause widespread problems as it propagates. In some embodiments, then, the volcanic plume detection system reports the elevation angle of arriving RF signals and the associated phase shift. In some embodiments it issues a stronger warning when an arriving RF signal has a substantial phase shift and a positive elevation angle than when an arriving RF signal has a substantial phase shift and a negative elevation angle. (The elevation angle need not be measured directly: it can be calculated from the known locations of the aircraft and the RF source.)

In accordance with another embodiment, the volcanic plume detection system uses multiple measurements of the phase delay of satellite signals that pass through a plume along various lines of sight to estimate the orientation of the plume. In the case depicted in FIG. 6, respective lines of sight 22, 24, 26 from three satellites 12, 14, 16 pass through a plume 2 that extends downwind from a volcano 6 and the corresponding RF signals are received by an RF receiver onboard an aircraft 10. The signal path 22 from satellite 12 passes through a section of the plume 2 that is narrow but has a high concentration of hydrogen sulfide. Because the path 22 is at a substantial angle to the plume's axis, the path length through the plume 2 is greater than the width of the plume, so the peak phase delay is greater than for a path perpendicular to the plume. The signal path 24 from satellite 14 passes through a section of the plume 2 that is moderately wide and has a moderate concentration of hydrogen sulfide. The path 24 is perpendicular to the plume's axis, so the peak phase delay is relatively small. The signal path 26 from satellite 16 passes through a wide section of the plume 2 with a low hydrogen sulfide concentration; the path 26 is at a substantial angle to the plume's axis. The volcanic plume detection system in accordance with one embodiment uses a computational model of a plume's effect on RF signals, given various paths through the plume, to estimate the plume location, orientation, and H2S concentration profile that give the best fit to measured phase delays and the estimated distances and vertical sizes. If data is available about winds, or about the location and status of dormant or active volcanoes, the system may also use that data to help choose the most plausible plume configuration that is consistent with the RF measurements.

Figure 6:
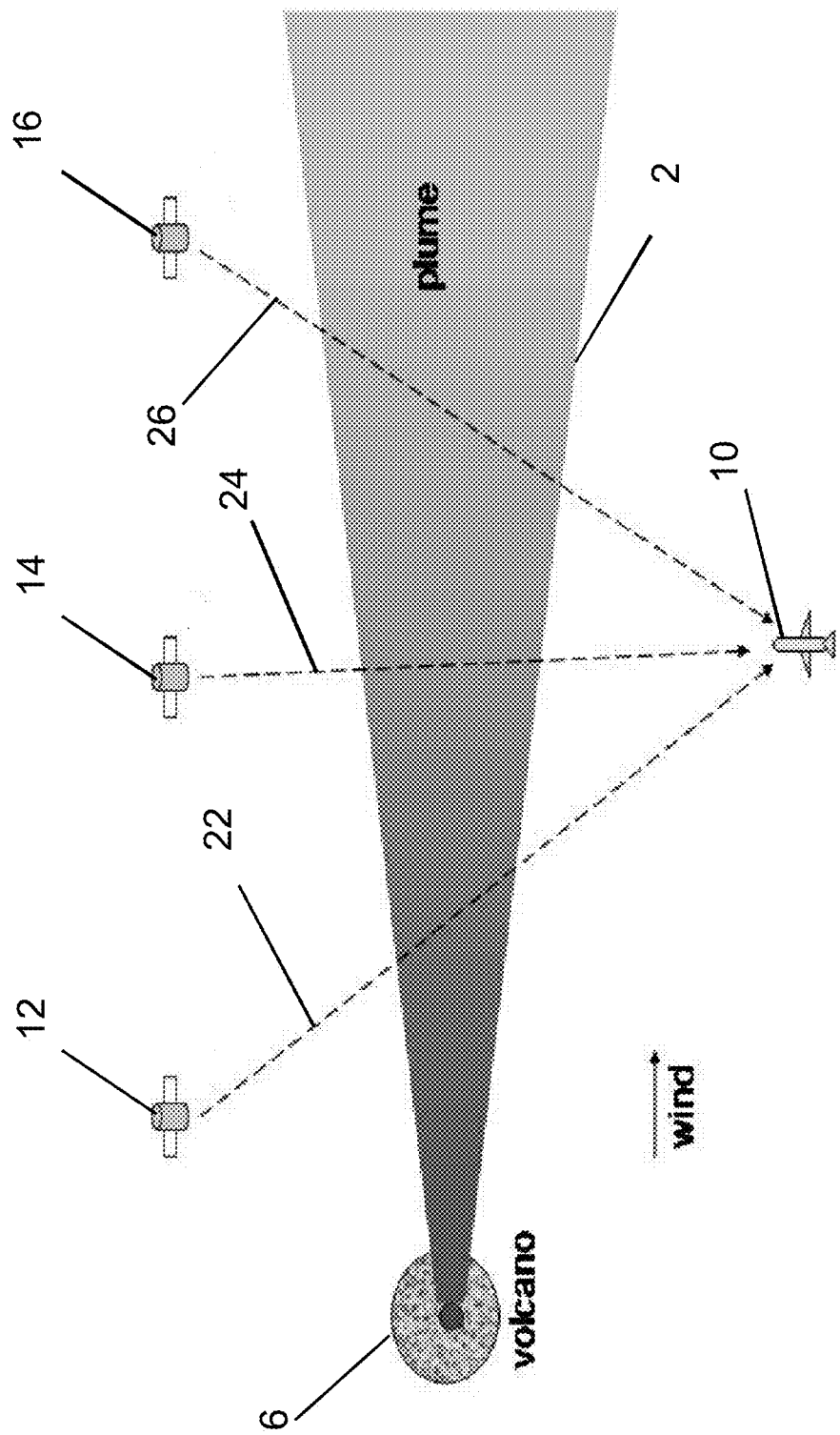
FIG. 6 is a top view showing radio transmission paths to an airplane from three satellites. All of the radio transmission paths traverse a volcanic plume. The darker shading of the plume cross section indicates higher $H_2S$ concentration.

Although FIG. 6 shows the measurements being done from a single airplane, other embodiments of the invention include use of signals received at multiple aircraft and relayed to a processing site where signals are combined to estimate the plume location and orientation. Three lines of sight are shown in FIG. 6, but the invention encompasses use of more than, or fewer than, three lines of sight through the plume.

The total phase shift along an RF path from a satellite to a receiver on an airplane is given by:

$$\Delta\phi = \int (n(\eta)-1) d\eta \quad (1)$$

where n is the index of refraction, $\eta$ is the distance coordinate along the path, and the limits of integration are zero (i.e., start at the satellite) and $\eta_{Rx}$ (i.e., end at the receiver). For a typical case, the index of refraction is unity for parts of the path that are in the vacuum, and slightly greater than unity for parts of the path that are in air.

The exact value of $n(\eta)$ is related to the properties of air as follows:

$$(n(\eta)-1) = 10^{-6} \times (a_1 P/T + a_2 P_w/T^2) \quad (2)$$

where T is the air temperature at $\eta$, P is the air pressure at $\eta$, $P_w$ is the water vapor pressure (i.e., a measure of humidity) at $\eta$, $a_1$ is 77.6 K mbar$^{-1}$ and $a_2$ is 3.73×10$^5$ K$^2$ mbar$^{-1}$. (See Ao, C. O. et al., Lower-Troposphere Refractivity Bias in GPS Occultation Retrievals, Journal of Geophysical Research, 108 (D18), pp. 1-12.)

For the present invention, terms similar to the water vapor term are added to Eq. (2) to incorporate the effects of other polar molecules:

$$(n(\eta)-1)=10^{-6} \times (a_1 P/T + a_2 P_w/T^2 + a_3 P_{SO2}/T^2 + a_4 P_{H2S}/T^2) \quad (3)$$

where $$a_3 \cong a_2(p_{SO2}/p_{H2O})(I_{H2O}/I_{SO2}) = a_2(0.831)(1/32.19)$$
$$= 0.0258 a_2, \quad (3a)$$

$$a_4 \cong a_2(p_{H2S}/p_{H2O})(I_{H2O}/I_{H2S}) = a_2(0.497)(1/1.97)$$
$$= 0.252 a_2, \quad (3b)$$

p is electric dipole moment, and I is moment of inertia. That is, the coefficient for each species' contribution to the index of refraction is proportional to that species' molecular electric dipole moment and inversely proportional to its moment of inertia.

Thus, if one were to take a simple case where the RF signal passes through the center of a volcanic plume so that account need not be taken for the extra length of a curved (refracted) path, the total phase delay would be the integral of Eq. (1), substituting the formula of Eq. (3) for (n(η)−1), where the values P(η), T(η), $P_w$(η), $P_{SO2}$(η), and $P_{H2S}$(η) are applied at each point along the integration. For example, let us assume the $H_2S$ pressure in the plume averages 10% of the 200 mbar total pressure at cruise altitude. This is about what one would predict if gas from Merapi andesite (containing 88.87 mole % $H_2O$ and 1.12 mole % $H_2S$, as reported by Symonds et al.) were to rise to cruise altitude, cooling adiabatically so the $H_2O$ condenses out. Let us assume T=233° K. Then:

$$(n-1)=10^{-6} \times 0.252 a_2 20 \text{ mbar}/233^2 = 34.7 \times 10^{-6}.$$

Let us also assume the RF path through the plume is ΔS=10 km ($10^4$ meters) long, which is consistent with a plume an hour or so downwind of the eruption. Then the phase shift is about:

$$\Delta\phi = \Delta S(n-1) = 10^4 \times 34.7 \times 10^{-6} = 0.347 \text{ meters}.$$

This phase shift is easy to detect with modern GPS systems, even those that are not specialized for meteorological measurements. Specialized receivers can measure phase shifts of a few centimeters.

The phase shift pattern produced by a volcanic plume differs from the pattern produced by turbulence in three ways:

(1) A volcanic plume imposes a large, low-frequency (1/few minutes to 1/few days) phase delay. A region of ordinary turbulence does not.

(2) The high-frequency (~1 Hz to 1 kHz) scintillation imposed by the plume will be much stronger than high-frequency scintillation from ordinary cruise-level turbulence, primarily because of the much greater concentration of polar molecules. The scintillation from ordinary turbulence is strongly limited by the low vapor pressure of water at cruise-level temperatures. The scintillation in a volcanic plume may be as little as 20 times higher than scintillation from ordinary turbulence if $H_2S$ constitutes about 10% of the plume at cruise altitude, is as well-mixed along the RF path as water vapor typically is, and temperature variations in the plume are no greater than in ordinary air. In many cases, the $H_2S$ will not be well mixed and temperature variations will be orders of magnitude greater than in typical weather, so scintillation will be substantially more than 20 times stronger than for ordinary turbulence.

(3) Turbulence from a volcanic plume will usually be detected in regions where little or no meteorological turbulence is expected. Meteorological turbulence typically occurs (a) near thunderstorms, (b) near the jet stream, or (c) downwind from, and relatively close to, a mountain range during strong winds. These conditions are well understood and are generally well predicted by the FAA's turbulence forecast model.

A general algorithm for detecting and evaluating the phase shift pattern comprises the following steps:

Input several phase measurements along non-identical lines of sight from the receiver to the source. (Typically, this means making phase measurements at intervals of 5 to 10 seconds over a span of about one minute using a single GPS or Iridium satellite near the horizon.)

Input the currently estimated atmosphere model. (This may include already-known volcanic material, i.e., plumes that need not be detected.)

Input the satellite (or other source) locations at the times of the phase measurements.

Input the receiver locations at the times of the phase measurements.

Compute predicted phase measurements given the predicted atmosphere. (This computation typically uses Eq. (2); if other volcanic plumes are already being tracked, it may use Eq. (3).)

Compute anomalous phase shifts (i.e., prediction errors) by subtracting measured phase measurements from the predicted phase measurements.

If the anomalous phase shift exceeds some user-selected positive threshold of magnitude, confidence, or both, then compute a best-fit plume model. This typically includes using at least a wind model, e.g., an estimate of the magnitude and direction of winds aloft. This wind model may be part of the atmosphere model loaded earlier. This also typically includes using a geographic information system (GIS) with information about volcanic risks. The plume model may be as simple as the parameters defining a cone, or it may be more sophisticated. The fitting algorithms may be as simple as a least squared error computation, a maximum entropy estimate, or other approaches known to those skilled in the art.

Report the best-fit plume model and statistical confidence information. This may include sending graphical data depicting the best-fit plume model, alphanumeric data representing the statistical confidence, and an instruction to activate a visual alert to a cockpit display. Alternatively, the alert could take the form of an instruction to activate a device for outputting an audible warning.

Furthermore, the scope of the invention is broad enough to encompass use of a variety of tomography algorithms to construct three- or four-dimensional models of a volcanic plume. A preferred tomography algorithm would be the 4DVAR method, which is a variational cost-minimization approach that fuses data from multiple sensors at various times and places and incorporate that data into a four-dimensional model, e.g., a computational model of the atmosphere including a volcanic plume. (A technical summary of the 4DVAR method can be found at http://www.ecmwf.int/news-events/training/rcourse_notes/DATA_ASSIMILATION/ASSIM_CONCEPTS/Assim_concepts11.html, the contents of which are incorporated by reference herein in its entirety.) Its output is an atmosphere model x that complies with known atmospheric (and volcanic) physics and is more accurate than an analysis could produce from a lone sensor. This approach, which is the most versatile and most accepted in the meteorology community, is based on variational analysis. In this approach, a vector x contains values of atmospheric properties to be estimated. An example of one property contained in x might be the temperature at altitude 25,000 feet, latitude 30 degrees, longitude 50 degrees east. Another value in x might be the humidity or $H_2S$ concentration at the same location. The values in x are varied to minimize a cost function given by $$J(x)=\frac{1}{2}(x-x_b)^T B^{-1}(x-x_b)+\frac{1}{2}(Hx-y_0)^T R^{-1}(Hx-y_0)$$

where J is the cost to be minimized; $x_b$ is a prior estimate of x based on other sensors or models, potentially including data about locations of known volcanoes and their eruption risk; B is a matrix of weights based on confidence in (and covariance of) various values in $x_b$; H is a "forward model" that transforms a given vector of atmospheric properties (such as $H_2S$ and $SO_2$ concentrations) into a vector of observable quantities such as RF phase delay or arrival angle at various times; $y_0$ is the vector of quantities actually observed; and R is a matrix of weights based on confidence in (and covariance of) various values of Hx and of $y_0$. Note that the forward model H used in each case depends on the trajectories of the airplane and of the GPS satellite used for the phase delay measurements.

A conceptually simpler tomography approach is reconstruction based on the Fourier Slice Theorem, described in Chapter 3 of *Principles of Computerized Tomographic Imaging*, IEEE Press, 1988, authored by A. C. Kak and Malcolm Slaney (the contents of which is incorporated by reference herein in its entirety). In particular, the Three-Dimensional Filtered Backprojection approach described in Section 3.6.2 is highly relevant. However, unlike the 4DVAR method, these "pure" tomography approaches do not incorporate any constraints based on atmospheric or volcanic physics, so they may deliver outputs that are somewhat unrealistic in cases where only a few measurements are available to constrain the model.

Besides the more-or-less steady change in phase delay as the RF path length through the plume changes, there is a characteristic pattern of RF scintillation caused by turbulence within the plume. Conditions within a volcanic plume are ripe for strong turbulence and scintillation, particularly when the plume is young—which is exactly the case in which an airplane is likely to encounter a volcanic plume without warning. A young plume has strong spatial gradients in temperature, ash density, water concentration, and hydrogen sulfide concentration. Heat from the volcanic eruption causes strong upward convection in the plume; radiative cooling of ash particles causes the top layers of the plume to cool rapidly (especially at night or at low sun angles), leading to strong downdrafts. The combination of strong turbulent convection with strong gradients in temperature and in concentrations of polar molecules causes very strong scintillation. Strong scintillation along a cruise-altitude RF path in the absence of thunderstorms is an indication of a volcanic plume. Other embodiments of the present invention provide a plume warning signal when strong scintillation is detected.

Scintillation is the technical term for twinkling, e.g., of a star. When one looks at a star, its brightness varies and the phase of light arriving from it varies. These variations are caused by regions of air that have greater or lesser index of refraction. These regions, called turbules, act like lenses. As the wind blows them across the observer's line of sight to the star, the turbules focus or defocus the light (changing its brightness) and increase or decrease the optical path length that the light must traverse (changing the phase). The same phenomenon occurs when an RF receiver "looks" at a flying radio source such as a GPS satellite. The amplitude of the received signal increases and decreases on time scales of a millisecond to about 1 second, and the phase of the received signal jitters on a similar time scale. This is RF scintillation.

Scintillation is typically measured as (1) variance of phase $\sigma_\phi^2$ (in $m^2$ or $cm^2$) as a function of frequency of the phase shift, and/or (2) variance of log amplitude $\sigma_\chi^2$ (in dB or percentage) as a function frequency of the amplitude variation.

For characterizing atmospheric turbulence, however, scintillation is only an indicator. Optical or RF turbulence in a fluid is characterized by the parameter $C_n^2$ (in $m^{-2/3}$), which is related to scintillation parameters by rather complicated (but well known) formulae, e.g., $$\sigma_\chi^2=0.56k^{7/6}\int C_n^2(\eta)(\eta/L)^{5/6}(L-\eta)^{5/6}d\eta \qquad (4)$$

where L is the total path length, k is the wavenumber ($2\pi$/Wavelength), and $\eta$ is the distance variable along the straight path. $C_n^2$ is related to the uneven distribution of polar gases by:

$$C_n^2=\gamma a^2(M/\omega_B)^2 \epsilon_\kappa^{2/3} \qquad (5)$$

where M is the gradient of the generalized potential refractive index, which—in layman's terms—is roughly the same as "spatial variability in the concentration of polar molecules". In non-volcanic air, this is dominated by the concentration gradient of water vapor. ($\epsilon_\kappa$ is the turbulence kinetic energy dissipation rate; $\gamma$ is a ratio of two kinds of dissipation rate; $a^2$ is a dimensionless universal constant roughly equal to 3; and $\omega_B$ is the buoyancy (or Brunt-Väisälä) angular frequency.) A young volcanic plume will have a very large value of M (and therefore a large value of $C_n^2$) because the polar species are concentrated near the center of the plume and have low concentrations a small distance away, while the intense heat of the eruption generates thermal turbulence which (a) creates large and small regions where polar gasses protrude into ordinary air and (b) creates rapid changes in temperature which, by Eq. (3), change the refractive index. A more mature volcanic plume has less intense heat, but still has a relatively high concentration of polar molecules which, relative to ordinary air, gives a high value of M, and therefore of $C_n^2$, for any given values of $\gamma$, $\omega_B$ and $\epsilon_\kappa$. In addition, ash particles in the plume absorb light and radiate infrared radiation differently than clear air or clouds of water droplets. This makes the plume warmer or cooler relative to the surrounding air, and therefore induces thermal gradients which, as formulated in Eq. (3), produce gradients in the index of refraction.

In accordance with preferred embodiments, the receiver hardware provides as outputs the amplitude and phase of signals arriving from each GPS satellite currently in line-of-sight. At a minimum, the software (which may be resident in the receiver) does the following: (a) continuously samples the amplitude and phase outputs; (b) computes the variance $\sigma_\chi^2$ of log(amplitude) and the phase variance $\sigma_\phi^2$ for each signal, updating the calculation every few seconds (typically five or 10 seconds); (c) compares the variance of log(amplitude) and phase to user-selected thresholds; and (d) if either variance exceeds the threshold, issues an alert to the pilot or air traffic controller.

In a more sophisticated embodiment, the software exploits the frequency dependence of amplitude and phase variation in atmospheric turbulence. A well-known body of prior art has established that turbulence roughly obeys Kolmogorov statistics, and that the resulting $C_n^2$ field has specific effects on the frequency spectrum of log(amplitude) and phase for signals traversing the turbulence: the log of power spectral density declines linearly with the log of scintillation frequency; the slope of that decline can reveal distance to the turbulence. Therefore, in a sophisticated embodiment, the software does the following: (a) continuously samples the amplitude and phase outputs; (b) computes the power spectral density of log(amplitude) and phase for each signal, updating the calculation every few seconds (typically five or 10 seconds); (c)

compares the power spectral density of log(amplitude) and phase to user-selected thresholds (which will typically vary by frequency in a roughly linear fashion); and (d) if the power spectral density exceeds one or more thresholds, issues an alert to the pilot or air traffic controller. The software may also check how well the power spectral density spectrum fits the linear model predicted for atmospheric turbulence.

In accordance with a basic embodiment, the volcanic plume detection system comprises: an antenna mounted to an aircraft and configured to receive satellite transmissions; an RF receiver connected to the antenna, with the receiver designed to measure phase shifts in the arriving signal; a computer connected to the receiver and programmed to compare phase shift patterns from the receiver with phase shift patterns corresponding to volcanic plumes; and an audible or visual alarm to alert the pilots when the receiver output matches a volcanic plume pattern or deviates from a plume-free pattern to within a user-specified level of confidence.

More sophisticated embodiments may include one or more of the following elements: additional antennas configured to receive satellite transmissions reaching the aircraft from a variety of azimuth angles; an RF receiver configured to measure phase shifts in transmissions from multiple satellite constellations, e.g., GPS, Glonass, Iridium, or DirecTV; a computer program to estimate at least one of the range to or the extent, density, or orientation of a volcanic plume; a means to display at least one of range to or the extent, density, or orientation of a volcanic plume; a communication system by which information about the absence or presence of a plume, and potentially its range, extent, density, or orientation, can be transmitted to other aircraft, air traffic controllers, or meteorologists; and a data fusion system that receives RF measurements from multiple aircraft and combines them to form an improved estimate of a plume's position, size, or density.

Figure 7:
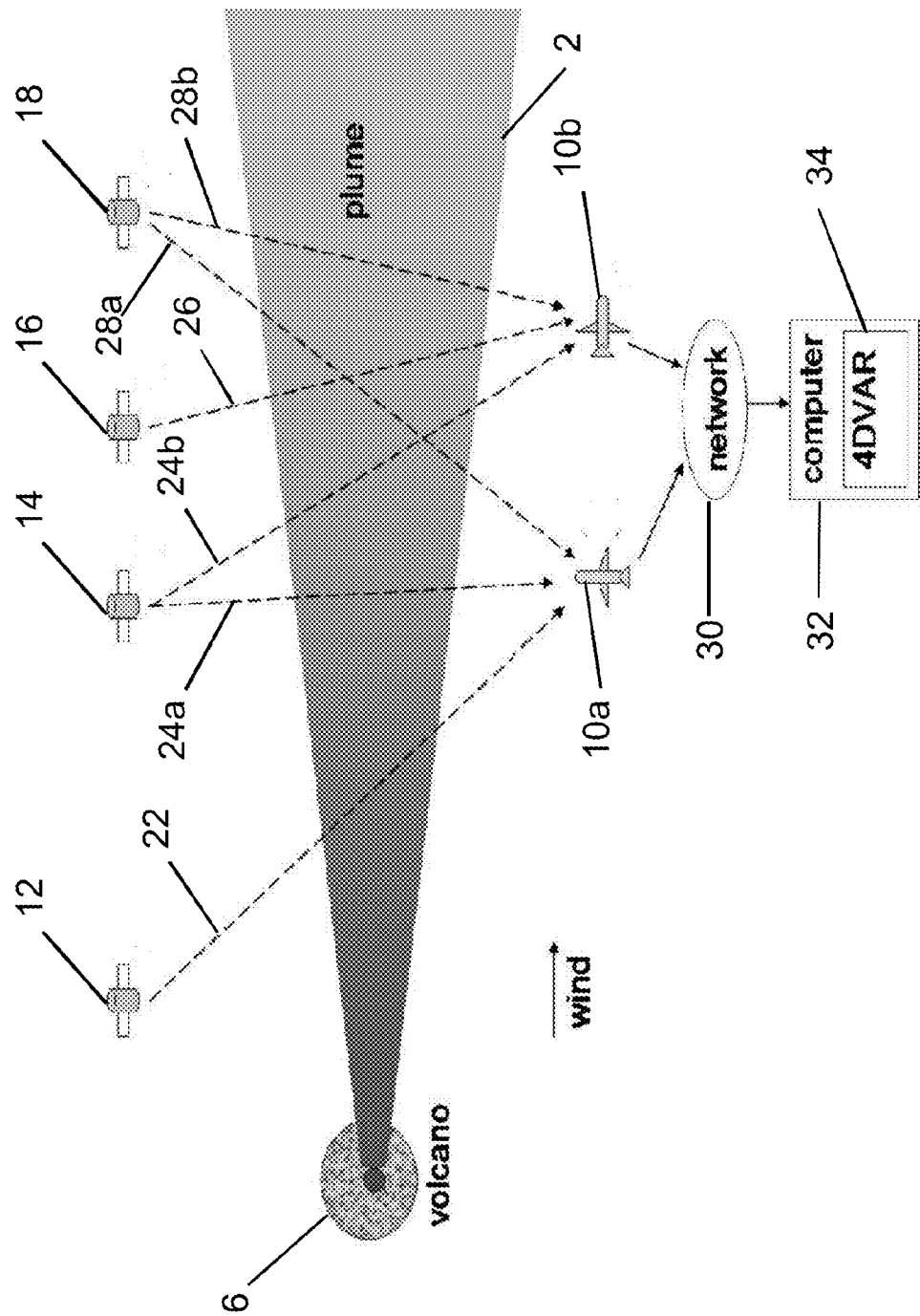
FIG. 7 is a top view showing radio transmission paths to two airplanes from a plurality of satellites. All of the radio transmission paths traverse a volcanic plume. The darker shading of the plume cross section again indicates higher $H_2S$ concentration.

FIG. 7 shows two aircraft 10a and 10b, each of which makes three sets of measurements. Each set of measurements is taken along a moving line of sight from the aircraft to a satellite, and spans a few seconds to a few minutes. Aircraft 10a measures RF phase shift (and optionally scintillation) along respective lines of sight 22, 24a, 28a to satellites 12, 14, 18. Aircraft 10b measures along respective lines of sight 24b, 26, 28b to satellites 14, 16, 18. Each aircraft transmits its measurements via a communication network 30 to a computer 32 running a tomography algorithm 34. A preferred tomography algorithm is 4DVAR because it is good at incorporating physics-based atmosphere and plume models, as well as incorporating multiple diverse measurements from diverse locations and times. However, other tomography algorithms may be used to suit the user's preferences, skills and resources.

Figure 8:
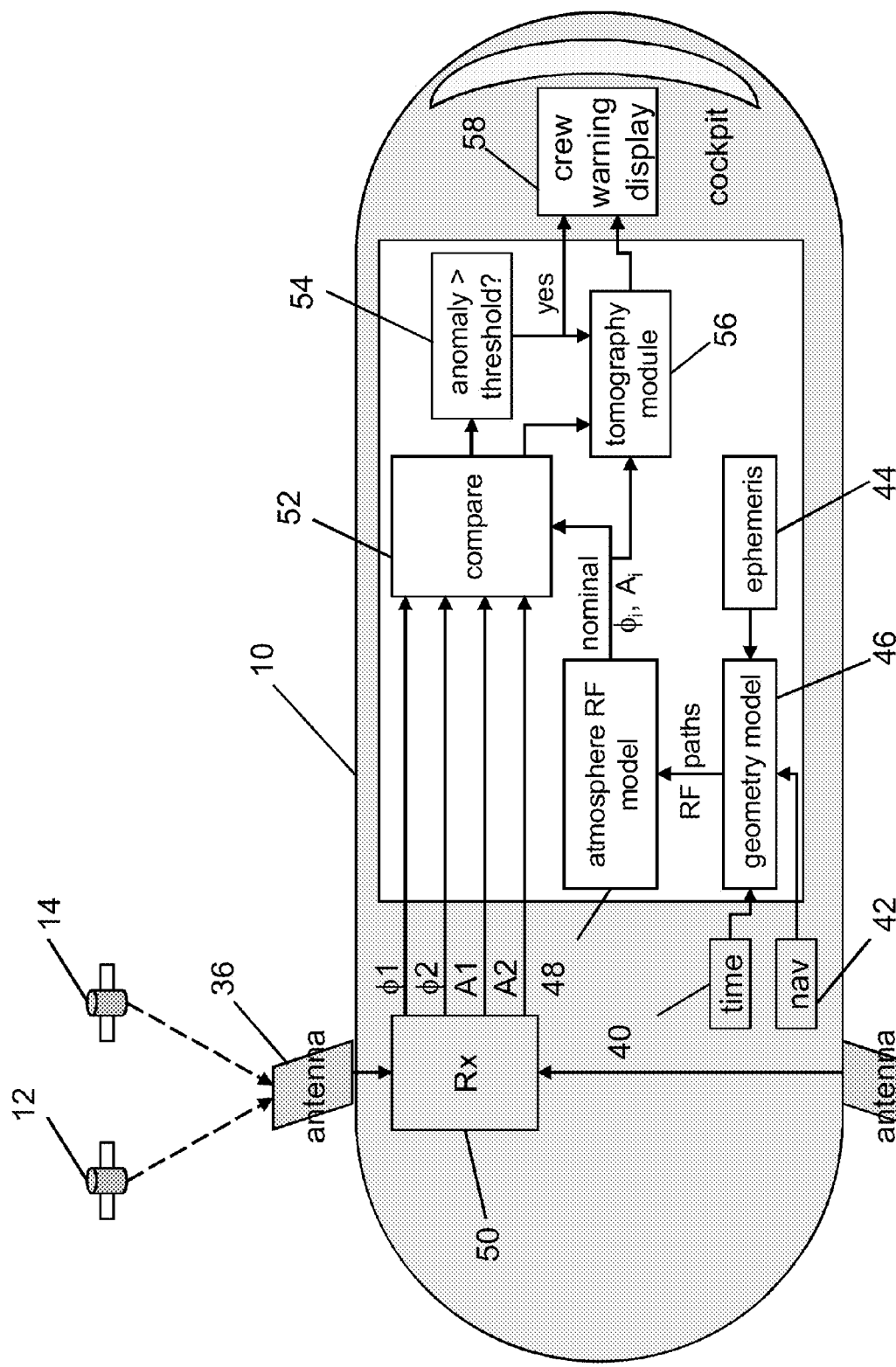
FIG. 8 is a diagram showing the electronic architecture aboard an aircraft in accordance with one embodiment of the invention.

FIG. 8 shows the mechanisms on an airplane in accordance with one embodiment of the invention. The airplane 10 has sources 40 and 42 of accurate time and navigation information respectively. The volcanic plume detection system onboard the airplane 10 includes satellite ephemeris data 44 that enables a computer to predict where each satellite will be at a given time. (This may be updated in real time via data encoded in the satellite signal.) The system also includes a geometry model 46 (software). Given a time signal, navigation data, and the ephemeris data, the geometry model 46 enables a computer to predict the geometric (i.e. unrefracted) RF path from the airplane 10 to each satellite 12 and 14. The atmosphere RF model 48 (software) computes how much the signal along each path is delayed (and in some embodiments, attenuated or amplified) by the nominal (plume-free) atmosphere. These outputs are indicated by the designations $\phi_i$ and $A_i$.

The airplane 10 has at least one antenna. In the embodiment shown in FIG. 8, two antennae 36 and 38 are shown. Each antenna is able to receive signals from more than one satellite. The receiver 50 distinguishes each satellite's signals from the others, even if all are received on the same antenna. (How this is done varies depending on the satellite constellation. For example, each GPS satellite transmits on a slightly different frequency.) For each satellite signal being received, the receiver outputs phase and, in some embodiments, amplitude and/or scintillation measurements. The comparison function 52 tests how well the measured phase (and other parameters, if implemented) matches the predicted value. If the measurement disagrees with the prediction by more than some user-selected threshold (block 54 in FIG. 8), then the system displays/announces a warning to the flight crew. FIG. 8 shows a crew warning display 58 (located in the cockpit) for displaying a visual warning. Alternatively, means could be provided to issuing an audible warning. In a typical embodiment, the warning is supplemented by information about the direction toward the satellite(s) whose RF signal revealed the anomaly, the type(s) of anomaly(ies), and the magnitude of the anomaly(ies).

As more measurements are collected, the system updates the display 58. Some embodiments include a tomography module 56 (software). When an anomaly large enough to trigger a warning occurs, the tomography module 56 begins recording the anomalies and using them to compute and display a probable distribution of volcanic gases (i.e., it computes a plume model).

Figure 9:
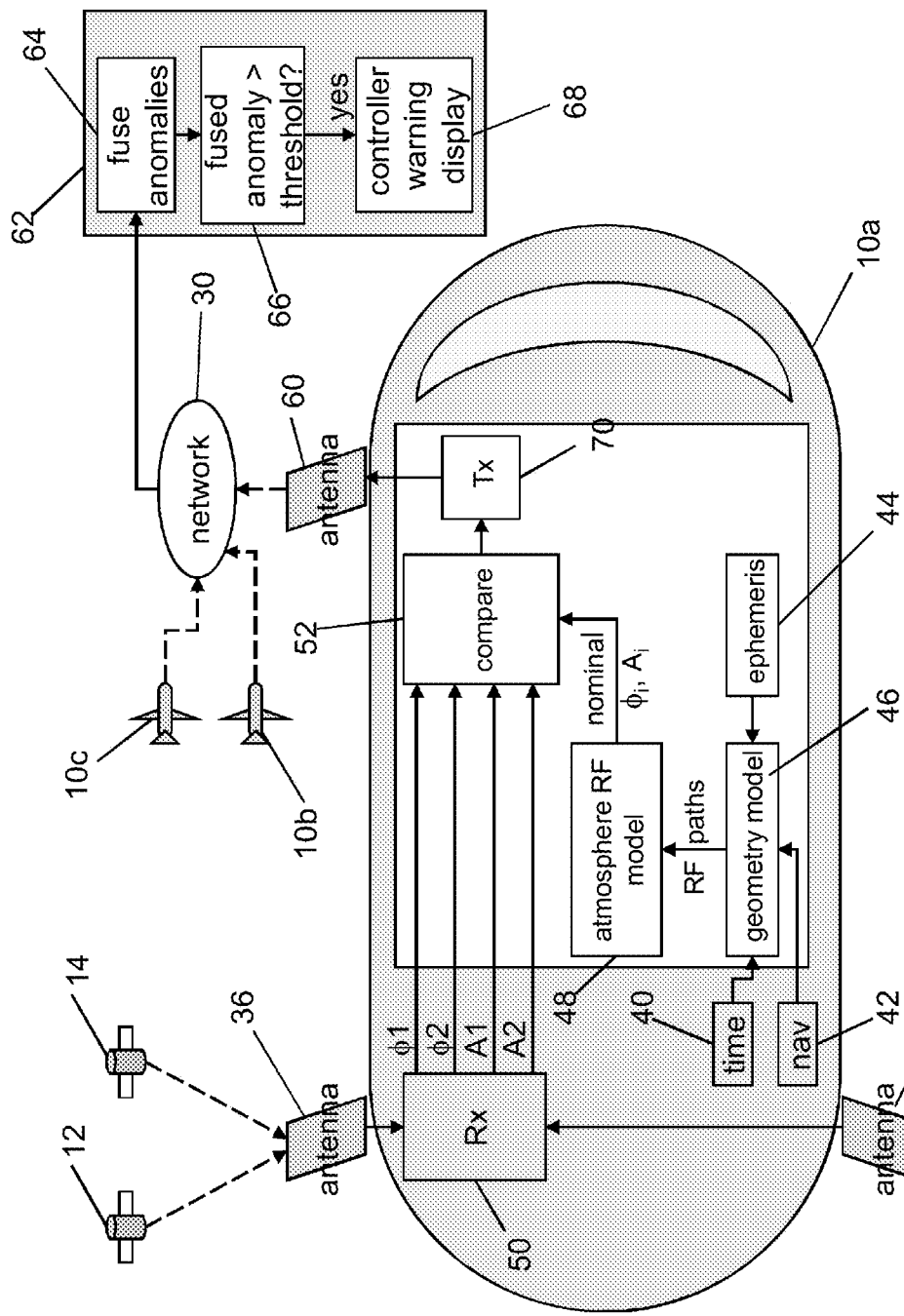
FIG. 9 is a diagram showing the electronic architecture for components with a large-scale data fusion architecture in accordance with another embodiment of the invention.

FIG. 9 shows elements within the overall multi-aircraft fusion architecture. Here, each aircraft 10a, 10b and 10c in the system transmits anomalies (and associated metadata, such as time and location of the aircraft and of the satellite) to the data fusion center 62 via a network 30. More specifically, FIG. 9 shows that the anomalies detected by the compare function 52 are outputted to a transmitter 70, which transmits the anomaly data to the network 30 by means of an antenna 60. All measurements are incorporated into the fusion system (step 64). When anomalies exceed a user selected threshold (step 66), the system issues a warning to a human controller, e.g., a visual warning displayed by a controller warning display 68. The particular fusion algorithm or approach may vary; as shown in FIG. 7, the 4DVAR algorithm is one of the suitable choices.

The embodiments of FIGS. 8 and 9 can be combined so an airplane includes a crew warning display and/or a tomography module, as well as a transmitter to send anomaly reports to a remote fusion center.

The volcanic plume detection systems disclosed herein should easily detect $H_2S$ even if the plume is somewhat diluted by air. A substantial body of work has shown that RF occultation can detect and measure fluctuations in water vapor at cruise altitude. At cruise altitude and $-40°$ C., the saturation abundance of $H_2O$ is about 0.06 mole % (and usually much less, since moisture-saturated air is rare at cruise altitude). In the volcanic-gas data published by Symonds et al., six of the seven values for $H_2S$ concentration in volcanic gases were above 0.06 mole %, and the majority were near 1.0 mole %—an order of magnitude greater than the abundance of water at cruise altitude. This more than compensates for the weaker dipole moment of $H_2S$, which is about a factor of about two less than the dipole moment of $H_2O$.

Installing the invention on multiple aircraft that communicate with a network improves the chance to detect a volcanic plume before any aircraft fly into it. Satellite signals can reach an airplane from the front, side, or rear; in many cases, the first RF signal that traverses a plume on the way to an airplane will reach an airplane that is not headed toward the plume, or that is still far away from the plume. A warning signal from the first aircraft to detect the plume can be relayed to all aircraft in the area. When a substantial number of aircraft are equipped with a volcanic plume detection systems as disclosed herein, the chance of any aircraft entering a plume without warning becomes very small.

An earlier analysis was done for detection of turbulence cells over the continental United States via their refractive effects on satellite signals. For comparison, let us assume that a very young volcano plume is comparable in size and RF effect to a 10-kilometer turbulence cell. (The plume may be less than 10 km thick, but the mean RF path length through the plume may be >10 km when we consider paths that traverse the plume at non-perpendicular angles.) Our analysis for turbulence detection using Iridium signals shows that more than 77% of the 10-km turbulence cells are detected soon enough to give at least 90 seconds of warning before any aircraft enters the cell. For plumes comparable to a 25-km cell, the warning rate exceeds 85%.

If appropriate RF receiving equipment (e.g., GPS and/or Iridium) is already on the aircraft, the embodiments listed above may use the existing antenna and/or receiver, thus lowering the cost of the system.

Although the disclosed embodiments involve the use of RF sensors on an airplane, the invention may also be embodied using RF sensors on a satellite like GPS/MET or COSMIC (both of which are configured to receive GPS signals that have passed through the atmosphere), on a weather balloon, or (with more signal processing to remove tropospheric RF effects) on a ship or buoy.

In summary, the embodiments disclosed herein use RF signals from a variety of sources rather than visual information based on sunlight or moonlight. These embodiments do not rely on geological sensors or human observation of volcanoes, so they can detect plumes from remote, un-instrumented volcanoes. Also, the disclosed embodiment do not rely on overhead passes by specially equipped sensing satellites. The disclosed embodiments rely on RF signals from satellites that pass the horizon at short intervals, e.g., 10 to 20 minutes. This shortens the average warning time by a factor of 10 to 50 compared to reliance on overhead passes by specially equipped sensing satellites. The disclosed embodiments provide direct warning to an airplane's pilot rather than relying on the process to issue a notice to airmen. Furthermore, RF signals from satellites penetrate clouds, so the embodiments disclosed herein are able to detect volcanic plumes embedded in other clouds. Also, RF signals from satellites are available at all times, so the disclosed embodiments provide detection at night when sunlight or moonlight may be insufficient.

Some satellite instruments or ground-based sensors used by geologists infer the presence of volcanic plumes by detecting hydrogen sulfide gas. However, these instruments either measure the spectral absorption of light passing through the gas or they directly measure the molecular composition of gas ingested into the instrument. The embodiments disclosed herein use the refraction (not absorption) of radio waves (not light) passing through the gas, and do not make measurements on ingested gas.

While the invention has been described with reference to various embodiments, it will be understood by those skilled in the art that various changes may be made and equivalents may be substituted for elements thereof without departing from the scope of the invention. In addition, many modifications may be made to adapt a particular situation to the teachings of the invention without departing from the essential scope thereof. Therefore it is intended that the invention not be limited to the particular embodiment disclosed as the best mode contemplated for carrying out this invention.

As used in the claims, the term "volcanic plume" means a plume of volcanic ash.

The invention claimed is:

1. A mobile platform comprising:
an antenna for converting a plurality of signals received from a plurality of signal sources remote from the platform along a plurality of paths into electronic data representing the received signals;
a receiver coupled to receive said electronic data representing the received signals from said antenna and programmed with software that measures characteristics of the received signals, wherein said receiver outputs electronic data representing measured values of said characteristics of the received signals;
a computer coupled to receive said electronic data representing measured values of said characteristics of the received signals from said receiver and programmed with software that: (a) processes said electronic data representing measured values of said characteristics of the received signals to determine whether or not said characteristics of the received signals include anomalies indicative of volcanic gas-induced refraction effects produced during propagation of the received signals along said paths; and (b) issues an activation signal when said characteristics of the received signals include said anomalies; and
an alarm device which generates a perceptible alarm in response to receipt of said activation signal.

2. The mobile platform as recited in claim 1, wherein the mobile platform is an aircraft.

3. The mobile platform as recited in claim 1, wherein said signal sources are satellites and said received signals are radiofrequency signals transmitted by said satellites.

4. The mobile platform as recited in claim 3, further comprising a navigation subsystem coupled to said computer for outputting electronic data representing the positions of said satellites and said mobile platform that is used during said processing by said computer.

5. The mobile platform as recited in claim 1, wherein the characteristics measured by said receiver include one or more of the following: phase delay, amplitude, phase variance and variance of log(amplitude).

6. The mobile platform as recited in claim 1, wherein the characteristics measured by said receiver comprise phase delay, and said computer is further programmed with software that estimates a range to a point of interest in a volcanic plume based at least in part on the measured phase delays of the received signals.

7. The mobile platform as recited in claim 1, wherein the characteristics measured by said receiver comprise phase delay, and said computer is further programmed with software that estimates a vertical extent of a volcanic plume based at least in part on the measured phase delays of the received signals.

8. The mobile platform as recited in claim 1, wherein the characteristics measured by said receiver comprise phase delay, and said computer is further programmed with software that estimates an orientation of a volcanic plume based at least in part on the measured phase delays of the received signals.

9. The mobile platform as recited in claim 1, wherein the characteristics measured by said receiver comprise phase delay, and said computer is further programmed with software that constructs a three- or four-dimensional model of a volcanic plume based at least in part on the measured phase delays of the received signals.

10. A method for detecting a volcanic plume in the Earth's atmosphere, comprising the following steps:
   (a) converting a plurality of signals received from a plurality of signal sources along a plurality of paths into electronic data representing the received signals;
   (b) measuring characteristics of the received signals;
   (c) outputting electronic data representing the measured values of said characteristics of the received signals;
   (d) processing said electronic data representing measured values of said characteristics of the received signals to determine whether or not said characteristics of the received signals include anomalies indicative of volcanic gas-induced refraction effects produced during propagation of the received signals along said paths;
   (e) issuing an activation signal when said characteristics of the received signals include said anomalies; and
   (f) generating a perceptible alarm in response to issuance of said activation signal.

11. The method as recited in claim 10, wherein steps (a) through (f) are performed by components located onboard a mobile platform, said signal sources are satellites, and said received signals are radiofrequency signals transmitted by said satellites.

12. The method as recited in claim 11, further comprising the step of generating electronic data representing the positions of said satellites and said mobile platform which is used during step (d).

13. The method as recited in claim 10, wherein the characteristics which are measured in step (b) include one or more of the following: phase delay, amplitude, phase variance and variance of log(amplitude).

14. The method as recited in claim 10, wherein the characteristics measured in step (b) comprise phase delay, further comprising the step of estimating a range to a point of interest in a volcanic plume based at least in part on the measured phase delays of the received signals.

15. The method as recited in claim 10, wherein the characteristics measured in step (b) comprise phase delay, further comprising the step of estimating a vertical extent of a volcanic plume based at least in part on the measured phase delays of the received signals.

16. The method as recited in claim 10, wherein the characteristics measured in step (b) comprise phase delay, further comprising the step of estimating an orientation of a volcanic plume based at least in part on the measured phase delays of the received signals.

17. The method as recited in claim 10, wherein the characteristics measured in step (b) comprise phase delay, further comprising the step of constructing a three- or four-dimensional model of a volcanic plume based at least in part on the measured phase delays of the received signals.

18. The method as recited in claim 10, wherein said processing step comprises comparing said electronic data representing measured values of said characteristics of the received signals to electronic data representing expected reference values of said characteristics of the received signals and storing any anomalies identified during said comparing step.

19. A system for detecting a volcanic plume in the Earth's atmosphere, comprising a plurality of mobile platforms, a network and a central processing system in signal communication with said plurality of mobile platforms via said network,
   wherein each of said mobile platforms comprises:
   an antenna for converting a plurality of signals received from a plurality of signal sources remote from the platform along a plurality of paths into electronic data representing the received signals;
   a receiver coupled to receive said electronic data representing the received signals from said antenna and programmed with software that measures characteristics of the received signals, wherein said receiver outputs electronic data representing measured values of said characteristics of the received signals;
   a first computer coupled to receive said electronic data representing measured values of said characteristics of the received signals from said receiver and programmed with software that compares said electronic data representing measured values of said characteristics of the received signals to electronic data representing expected reference values of said characteristics of the received signals and generates electronic data representing anomalies identified during said comparing step; and
   a transmitter coupled to receive said electronic data representing said anomalies from said computer and then transmit signals representing said anomalies to said network, and
   wherein said central processing system comprises a second computer coupled to receive electronic data representing said anomalies from said network, said second computer being programmed with software that processes said electronic data representing anomalies and issues an a warning signal when said anomalies are indicative of volcanic gas-induced refraction effects produced during propagation of the received signals along said paths.

20. The system as recited in claim 19, wherein said signal sources are satellites and said received signals are radiofrequency signals transmitted by said satellites.

21. A mobile platform comprising:
   an antenna for converting a plurality of signals received from a plurality of signal sources remote from the platform along a plurality of paths into electronic data representing the received signals;
   a receiver coupled to receive said electronic data representing the received signals from said antenna and programmed with software that measures characteristics of the received signals, wherein said receiver outputs electronic data representing measured values of said characteristics of the received signals;
   a computer coupled to receive said electronic data representing measured values of said characteristics of the received signals from said receiver and programmed with software that: (a) processes said electronic data representing measured values of said characteristics of the received signals to determine whether or not said characteristics of the received signals include anomalies indicative of volcanic plume turbulence-induced scintillation effects produced during propagation of the received signals along said paths; and (b) issues an activation signal when said characteristics of the received signals include said anomalies; and
   an alarm device which generates a perceptible alarm in response to receipt of said activation signal.

* * * * *